United States Patent Office
2,906,702
Patented Sept. 29, 1959

2,906,702

REACTIVATION OF PLATINUM CATALYSTS

Harry M. Brennan, Whiting, Herman S. Seelig, Valparaiso, and Roy W. Vander Haar, Hammond, Ind., assignors to Standard Oil Company, Chicago, Ill., a corporation of Indiana No Drawing. Application December 17, 1953
Serial No. 398,852

11 Claims. (Cl. 208—140)

This invention relates to platinum catalysts, and more particularly to the treatment of deactivated platinum catalysts to restore the activity hereof.

Alumina-supported platinum catalysts are now employed on a large scale in the conversion of low-octane naphthas into gasolines of high antiknock rating by means of the so-called "hydroforming" process. In this process, the activity and selectivity of the catalyst depend upon a variety of factors, such as the presence and proportion of contaminating materials in the charging stock, the conversion temperature, the hydrogen partial pressure in the conversion zone, and the like. The catalyst life can be prolonged by pretreating the charging stock to remove metals, sulfur, arsenic, and the like therefrom, by limiting the conversion temperature to less than about 875° F., and by operating at a hydrogen partial pressure above about 500 pounds per square inch. Under these conditions, however, the catalyst is considerably less effective in carrying out the desired reactions, and in any event it ultimately becomes degraded in activity and/or selectivity, and must be discarded or subjected to some form of reactivation. Various techniques have been proposed for this purpose in the prior art, most of them based upon a treatment of the catalyst with oxygen in order to remove carbonaceous deposits therefrom and to effect changes of indeterminate nature in the catalytic metal structure. These techniques are capable at best of restoring the catalyst to a level approaching its initial level of activity. We have now discovered a new technique which does not merely restore the catalyst to its original condition, but actually raises it to a level of activity exceeding the activity thereof when freshly prepared.

It is accordingly an object of our invention to improve the hydroforming of hydrocarbons. Another object is to restore the catalytic activity of supported platinum catalysts after deactivation thereof in the hydroforming of hydrocarbons. Another object is to treat a deactivated platinum-alumina catalyst and to produce a catalyst of superior activity therefrom. A further object is to remove deleterious substances from deactivated platinum-alumina catalysts. These and other objects of our invention will be apparent from the following description thereof.

The method of our invention employs the step of contacting a deactivated platinum-alumina catalyst with gaseous chlorine, fluorine, or other halogen or halogen-affording substance at an elevated temperature. This procedure not only reactivates the catalyst, but also converts various impurities therein into volatile and soluble derivatives which are readily removed by steaming or other treatment with an aqueous medium. Such treatment with an aqueous medium also serves to redistribute the platinum on the alumina support, and to remove labile halogen therefrom; and all of these results are accomplished without impairment of the mechanical strength of the catalyst particles.

Our new technique is effective to improve the catalytic properties of alumina-supported platinum catalysts after deactivation thereof in a hydrocarbon conversion process such as the hydroforming of low-octane naphthas. In a typical hydroforming process, a mixture of charging stock and hydrogen-containing gas is passed through a catalyst bed, where the hydroforming reactions are carried out at a temperature in the range of about 800 to 1050° F., a total pressure between about 100 and 1200 pounds per square inch gage, a hydrogen partial pressure between about 50 and 1000 pounds per square inch, a hydrogen rate of 1000 to 10,000 standard cubic feet per barrel of charging stock, and an hourly weight space velocity between about 0.5 and 10. Within this range of conditions, the satisfactory catalyst life before regeneration or reactivation becomes necessary is found to vary in an inverse direction to the severity of treatment. Under mild conditions, the catalyst may function for months without serious decline in properties, while under more severe conditions, especially at lower hydrogen partial pressures, the satisfactory catalyst life per cycle may be as little as a few days.

After removal from on-stream conditions, the deactivated catalyst can be subjected to treatment at once according to our new process. We prefer, however, to purge residual charging stock and hydrogen from the catalyst zone with steam or an inert gas in order to avoid any possibility of forming explosive mixtures with our halogen treating gas. Thereafter, chlorine, fluorine, or other gaseous halogen, or chlorine trifluoride, bromine trifluoride, or other substance affording halogen under the conditions employed is passed through the catalyst at an elevated temperature, suitably above about 300° F., preferably between about 600 and 1400° F., and optimally around 850 to 1000° F., for a period of 0.25 to 24 hours. It is desirable to employ halogen in a sufficient quantity to react with a substantial proportion of the platinum and to form a halide derivative thereof. For this purpose, we prefer to employ halogen in a total atomic ratio to platinum of at least about 2:1 and optimally at least about 4:1. Large excesses of halogen do not appear to be deleterious to the catalyst. The partial pressure of halogen will obviously vary widely depending upon the temperature and the particular halogen or halogen-affording substance employed. We normally employ a substantially pure halogen gas at ordinary pressures. Water vapor may be included in the treating zone if desired as a promoter for the reaction of halogen with the various components of the catalyst. The proportion of water vapor should be restricted to a low level, suitably less than about 10 mole-percent of the halogen, in order to minimize corrosion of the process equipment.

A halogen treatment under the described conditions is effective to restore the catalyst to an activity approaching its original level. Further improvement can thereafter be achieved by subjecting the catalyst to contact with an aqueous medium, suitably water, aqueous ammonia, or preferably steam, in order to remove labile halogen therefrom. This treatment is also believed to effect a dissolving and redistribution of platinum halides in the catalyst structure, whereby the catalyst properties are improved. Furthermore, various impurities such as iron, arsenic, and the like, which are converted into volatile and/or soluble derivatives by the halogen treatment, are removed by the aqueous medium. Steaming is suitably carried out at a temperature between about 700 and 1100° F. for a period of 2 to 12 hours. Washing with water is satisfactorily carried out at ordinary or elevated temperatures with from 1 to 5 volumes of water per volume of catalyst, preferably until soluble halogen has been largely removed. Washing with aqueous ammonium hydroxide can be carried out under substantially the same conditions, employing a solution containing from about 2 to 28 percent by weight of $NH_3$, and is ordinarily faster and more effective in removing halogen. After treatment with a liquid-phase aqueous medium the catalyst should be dried at 175 to 400° F. for a period of 4 to 24 hours, and should then be calcined in air, hydrogen, or inert gas at a temperature between about 800 and 1200° F. for around 2 to 12 hours or more. Finally, after any of the foregoing treatments, it is desirable to contact the catalyst with hydrogen or a hydrogen-containing gas at a temperature in or around the hydroforming range, or the said hydrogen treatment is achieved during the utilization of the catalyst at elevated temperature in the hydroforming process itself.

The halogen treatment may optionally be preceded by a burn-off operation under mild conditions to remove carbon and organic residues from the catalyst particles. The carbon burn-off is suitably carried out with dilute oxygen (around 2 percent oxygen being preferred) at a temperature above about 800° F. and below about 1300° F., and the carbon content of the catalyst is ordinarily reduced below about 0.05 percent by weight in a contact time of around 1 to 24 hours.

As a further alternative, prior to the halogen treatment employed in our process, we may subject the catalyst to an oxidative rejuvenation treatment at elevated temperature, preferably at a temperature between about 950 and 1300° F., and oxygen partial pressure above about 0.4 atmosphere, and a contact time of around 15 minutes or more. Such a rejuvenation treatment should be carried out before the carbon level on the catalyst exceeds 0.1 percent by weight, or should be preceded by a carbon burn-off treatment under the conditions set forth above, in order to avoid localized overheating of the catalyst at the partial pressure of oxygen employed.

As a further alternative, the halogen treatment employed in our process can be satisfactorily carried out by introducing halogen or a halogen-affording substance into the catalyst zone together with the oxygen-containing gas in the carbon burn-off and/or oxidative rejuvenation steps, defined hereinabove.

Our invention is useful in the treatment of the broad class of alumina-supported platinum catalysts. The alumina support is preferably eta-alumina or gamma-alumina, derived from alumina hydrosol, alumina hydrogel, alumina xerogel, alumina monohydrate, sintered alumina, and the like, all of which can be prepared according to methods described in the prior art. Into the alumina may be incorporated a mild cracking adjuvant or promoter if desired, such as chloride, fluoride, silica, boria, chromia, an oxide of phosphorus, or the like, suitably in the proportion between about 0.1 and 8 percent by weight, based on dry $Al_2O_3$. The alumina support should be substantially freed from soluble salts and other undesirable impurities by washing. The platinum can be added to the alumina in the form of a platinum compound such as chloroplatinic acid, platinum tetrachloride, or the like, or a solution thereof, or preferably a stable colloidal suspension or solution of a platinum sulfide; and the proportion of platinum in the completed catalyst should be between about 0.05 and 1 percent by weight of the alumina on a dry basis. The catalyst can be prepared in any desired mechanical form according to the specific process and equipment for which it is intended.

In a preferred embodiment of our invention, a cogelled platinum-alumina catalyst, after becoming deactivated in a hydroforming operation, is subjected to a mild oxidation with 2 percent oxygen in nitrogen at 900 to 1100° F. to remove carbon and organic materials therefrom, then optionally soaked at 950 to 1300° F. for 0.1 to 10 hours in an atmosphere containing oxygen at a partial pressure of 0.4 atmosphere or higher, thereafter contacted with gaseous chlorine at 800 to 1000° F. for 0.5 to 5 hours, steamed at 700 to 1100° F. for 0.5 to 5 hours, and finally calcined in hydrogen at 800 to 1200° F. for one to 12 hours.

Our invention will be more fully understood from the following specific examples.

A cogelled platinum-alumina catalyst containing 0.6 percent by weight of platinum, based on dry $Al_2O_3$, was employed in five hydroforming cycles, totalling 360 hours on stream, during which various naphthenic and paraffinic petroleum naphthas boiling in the general range of 200 to 365° F. were treated at 200 to 300 pounds per square inch gage, maximum catalyst temperatures between 930 and 980° F., hourly weight space velocities between 0.9 and 2.0, and hydrogen rates between 4,000 and 5,000 standard cubic feet per barrel of feed. Carbon was burned from the catalyst after each of the first four cycles. When the fifth cycle had been completed, it was found that the catalyst had dropped substantially in activity. The catalyst was then subjected to a simultaneous stripping and soaking in a recycle hydrogen stream at 950° F. and 200 pounds per square inch gage for 12 hours. Thereafter it was subjected to a mild oxidation with 2 percent oxygen in nitrogen, during which carbon and organic materials were burned therefrom in a combustion front which traversed the catalyst bed at a maximum temperature around 1050° F. The carbon-depleted catalyst was subjected to a series of oxidations and reductions, successively employing air at a pressure of 100 pounds per square inch gage and a temperature of 1050 to 1100° F. for 8 hours, then cylinder hydrogen at a pressure of 100 pounds per square inch gage and a temperature of 950° F. for 8 hours. The oxidized and reduced catalyst was cooled and divided into aliquots.

One aliquot of the oxidized and reduced catalyst was subjected to a standardized hydroforming test in a quasi-isothermal reaction tube surrounded by an electrically heated metal block for temperature control. The charging stock was a Mid-Continent virgin naphtha having an ASTM boiling range of 200–360° F., a CFR-R octane number of 44, a sulfur content of 0.03 percent, an API gravity of 56.5, a Reid vapor pressure of 1.8 pounds per square inch, a bromine number of 1.4, and a composition of 40 percent naphthenes, 52 percent paraffins, and 8 percent aromatics. The test was carried out at a block temperature of 960° F., a catalyst temperature of 920° F., a reactor pressure of 200 pounds per square inch, an hourly weight space velocity around 2, and a once-through hydrogen rate around 5000 standard cubic feet per barrel of feed. The products were collected and analyzed with the following results:

| Product interval, hr. | Octane number, CFR-R | Relative activity |
|---|---|---|
| 0–20 | 90.0 | 46 |
| 20–40 | 89.8 | |
| 40–60 | 89.7 | 34 |

The figures for relative activity given above are the volumes of an arbitrarily chosen standard catalyst, prepared by cogelation of platinum and alumina and containing 0.6 percent by weight of platinum, based on dry $Al_2O_3$, required to produce the same results as 100 volumes of the catalyst undergoing test.

Another aliquot of the oxidized and reduced catalyst was contacted with chlorine gas at 950° F. and one atmosphere for one hour. The treated catalyst was subjected to a standardized hydroforming test at an hourly weight space velocity around 4, the other conditions being as noted in connection with the previous test. The results demonstrate the striking effectiveness of halogen treatment in the reactivation of platinum-alumina catalysts:

| Product interval, hr. | Octane number, CFR-R | Relative activity |
|---|---|---|
| 0- 20 | 95.0 | 200 |
| 20- 40 | 93.0 | 178 |
| 40- 60 | 92.4 | |
| 60- 80 | 90.4 | 100 |
| 80-100 | 89.8 | 91 |
| 100-120 | 92.4 | |
| 120-140 | 89.0 | 89 |

Another aliquot of the oxidized and reduced catalyst was treated with a stream of dry hydrogen chloride at 1000° F. for 15 minutes, then with a stream of air at 1000° F. and one atmosphere for 30 minutes. The treated catalyst was found to contain 2.27 percent by weight of chloride, compared with only 1.6 percent chloride in a chlorine-treated catalyst. On being subjected to a standardized hydroforming test under the conditions defined above, including an hourly weight space velocity of 2, the HCl-treated catalyst was found to have been greatly reduced in activity:

| Product interval, hr. | Octane number, CFR-R | Relative activity |
|---|---|---|
| 0- 20 | 80.1 | |
| 20- 40 | | |
| 40- 60 | 68.5 | 15 |
| 60- 80 | 65.6 | 12 |
| 80-100 | 64.4 | 12 |

Another aliquot of the oxidized and reduced catalyst was treated with a stream of chlorine gas at 950° F. for one hour, after which time it was found to have a chloride content of 1.75 percent by weight. The treated catalyst was washed ten times with aqueous 10 percent ammonium hydroxide at room temperature, the catalyst being immersed four to five minutes in an equal volume of fresh ammonium hydroxide solution in each washing step. The washed catalyst was dried overnight at 220° F., then calcined in air at 1100° F. for six hours. A catalyst containing 0.54 percent of chloride and having a greatly improved activity was obtained in this way.

Another aliquot of the oxidized and reduced catalyst was treated with a stream of steam at 950° F. for two hours. The treated catalyst contained only 0.37 percent by weight of chloride, and was greatly improved in activity.

While we have described our invention with reference to certain specific embodiments, it is to be understood that such embodiments are illustrative only and not by way of limitation. Numerous additional embodiments of the invention and alternative manipulative techniques, process materials, and operating conditions will be apparent from the foregoing description to those skilled in the art.

In accordance with the foregoing description, we claim as our invention:

1. A method for reactivating an alumina-supported platinum catalyst after deactivation thereof by exposure to a hydrocarbon charging stock under conversion conditions and after burning carbonaceous deposits therefrom, which comprises the steps of exposing the said catalyst to contact at elevated temperature with a treating agent selected from the group consisting of halogens and substances affording a halogen under the treating conditions, and thereafter contacting the said catalyst with an aqueous medium, whereby labile halogen is removed therefrom.

2. A method for reactivating an alumina-supported platinum catalyst after deactivation thereof by exposure to a hydrocarbon charging stock under conversion conditions and after burning carbonaceous deposits therefrom, which comprises the steps of contacting the said catalyst with a halogen at a temperature between about 600 and 1400° F., and thereafter contacting the said catalyst with an aqueous medium, whereby labile halogen is removed therefrom.

3. A method for reactivating a platinum-alumina catalyst after deactivation thereof by exposure to a petroleum naphtha under hydroforming conditions and after burning carbonaceous deposits therefrom, which comprises the steps of contacting the said catalyst with chlorine at a temperature between about 600 and 1400° F., and thereafter steaming the treated catalyst at a temperature between about 700 and 1100° F., whereby labile halogen is removed therefrom.

4. A method for reactivating a platinum-alumina catalyst after deactivation thereof by exposure to a petroleum naphtha under hydroforming conditions and after burning carbonaceous deposits therefrom, which comprises the steps of contacting the said catalyst with gaseous chlorine at a temperature between about 600 and 1400° F., water-washing the treated catalyst to remove labile chlorine therefrom, and drying and calcining.

5. A method for reactivating a platinum-alumina catalyst after deactivation thereof by exposure to a petroleum naphtha under hydroforming conditions and after burning carbonaceous deposits therefrom, which comprises the step of contacting the said catalyst with gaseous chlorine at a temperature between about 600 and 1400° F., thereafter washing the catalyst with aqueous ammonium hydroxide to remove labile halogen therefrom, and drying and calcining.

6. A method for reactivating a platinum-alumina catalyst after deactivation thereof by contact with a petroleum naphtha under hydroforming conditions, which comprises the steps of burning carbon from the said catalyst, contacting the carbon-depleted catalyst with gaseous chlorine at a temperature between about 600 and 1400° F., steaming the chlorine-treated catalyst at a temperature between about 700 and 1100° F., and contacting the catalyst with a hydrogen-containing gas at a temperature within the hydroforming range.

7. A method for reactivating a platinum-alumina catalyst after deactivation thereof by exposure to a petroleum naphtha under hydroforming conditions, which comprises the steps of burning carbonaceous deposits from the said catalyst contacting the said catalyst with gaseous chlorine in a total atomic ratio of chlorine to platinum above about 2:1 at a temperature between about 850 and 1000° F. for a period of 0.25 to 24 hours, steaming the chlorine-treated catalyst at a temperature between about 700 and 1100° F. for a period of 2 to 12 hours, whereby labile chlorine and volatile impurities are removed therefrom, and contacting the catalyst with a hydrogen-containing gas at a temperature within the hydroforming range.

8. An improvement in a cyclic hydroforming process, which process comprises contacting a petroleum naphtha under hydroforming conditions with a catalyst consisting essentially of pure alumina and between about 0.05 and 1 percent by weight of platinum, whereby said catalyst accumulates carbon and falls in activity and selectivity below its initial level, thereafter withdrawing said catalyst from said hydroforming conditions, burning carbon therefrom, reactivating said catalyst, and returning the reactivated catalyst to said hydroforming conditions, which improvement comprises effecting said reactivation by contacting the carbon-depleted catalyst with gaseous chlorine at a temperature between about 600 and 1400° F., and steaming the chlorine-treated catalyst at a temperature between about 700 and 1100° F. to remove labile halogen therefrom.

9. A method of reactivating an alumina supported platinum-containing catalyst which has become deactivated during hydroforming and contains carbonaceous deposits, which comprises the steps of treating the deactivated catalyst with an oxygen containing gas at elevated temperatures to burn the carbonaceous deposits therefrom; contacting the catalyst with at least 0.1 weight percent of chlorine based on the supported catalyst at an elevated temperature below 1250° F. and stripping excess chlorine from the catalyst by means of steam.

10. An improvement in a cyclic hydrocarbon conversion process, which process comprises contacting a hydrocarbon charging stock under conversion conditions with an alumnia-supported platinum catalyst, whereby said catalyst accumulates carbon and falls in activity and selectivity below its initial level, thereafter withdrawing said catalyst from said conversion conditions, reactivating said catalyst and returning the reactivated catalyst to said conversion conditions, which improvement comprises effecting said reactivation by burning said carbon from the said catalyst, exposing the said catalyst to contact at elevated temperature with a treating agent selected from the group consisting of halogens and substances affording a halogen at said elevated temperature, and contacting the halogen-treated catalyst with an aqueous medium, whereby labile halogen is removed therefrom.

11. An improvement in a cyclic hydroforming process, which process comprises contacting a petroleum naphtha under hydroforming conditions with a catalyst consisting essentially of alumina and between about 0.05 and 1 percent by weight of platinum, based on dry $Al_2O_3$, whereby said catalyst accumulates carbon and falls in activity and selectivity below its initial level, thereafter withdrawing said catalyst from said hydroforming conditions, reactivating said catalyst and returning the reactivated catalyst to said hydroforming conditions, which improvement comprises effecting said reactivation by burning said carbon from the said catalyst, contacting said catalyst with gaseous chlorine at a total atomic ratio of chlorine to platinum of at least about 2:1 at a temperature between about 600 and 1400° F., washing the treated catalyst with aqueous ammonium hydroxide to remove labile halogen therefrom, and drying the washed catalyst.

References Cited in the file of this patent

UNITED STATES PATENTS

| | | |
|---|---|---|
| 2,479,110 | Haensel | Aug. 16, 1949 |
| 2,642,384 | Cox | June 16, 1953 |
| 2,667,461 | Guyer et al. | Jan. 26, 1954 |
| 2,704,281 | Appell | Mar. 15, 1955 |

FOREIGN PATENTS

| | | |
|---|---|---|
| 115,333 | Germany | Dec. 15, 1899 |
| 20,915 | Great Britain | July 9, 1903 |